Figure 18:
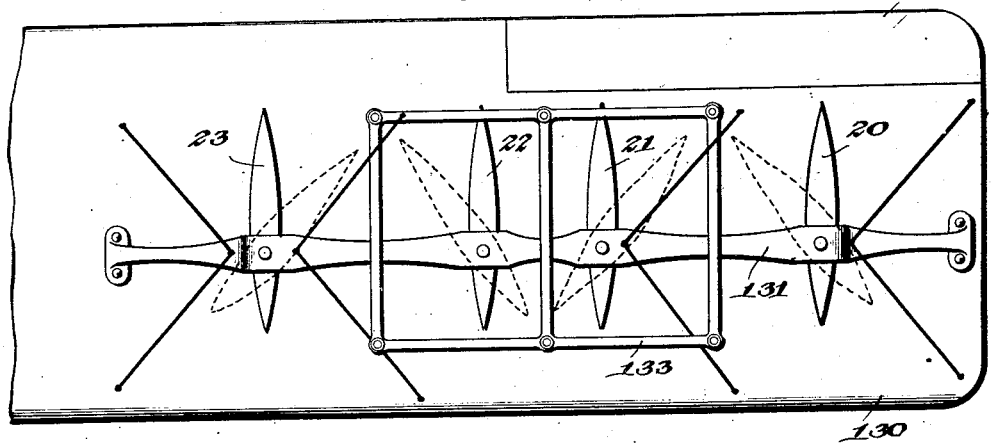

June 2, 1931.  M. H. DEPUE  1,808,344
CONTROL FOR AIRPLANES
Filed Dec. 5, 1929  4 Sheets-Sheet 1
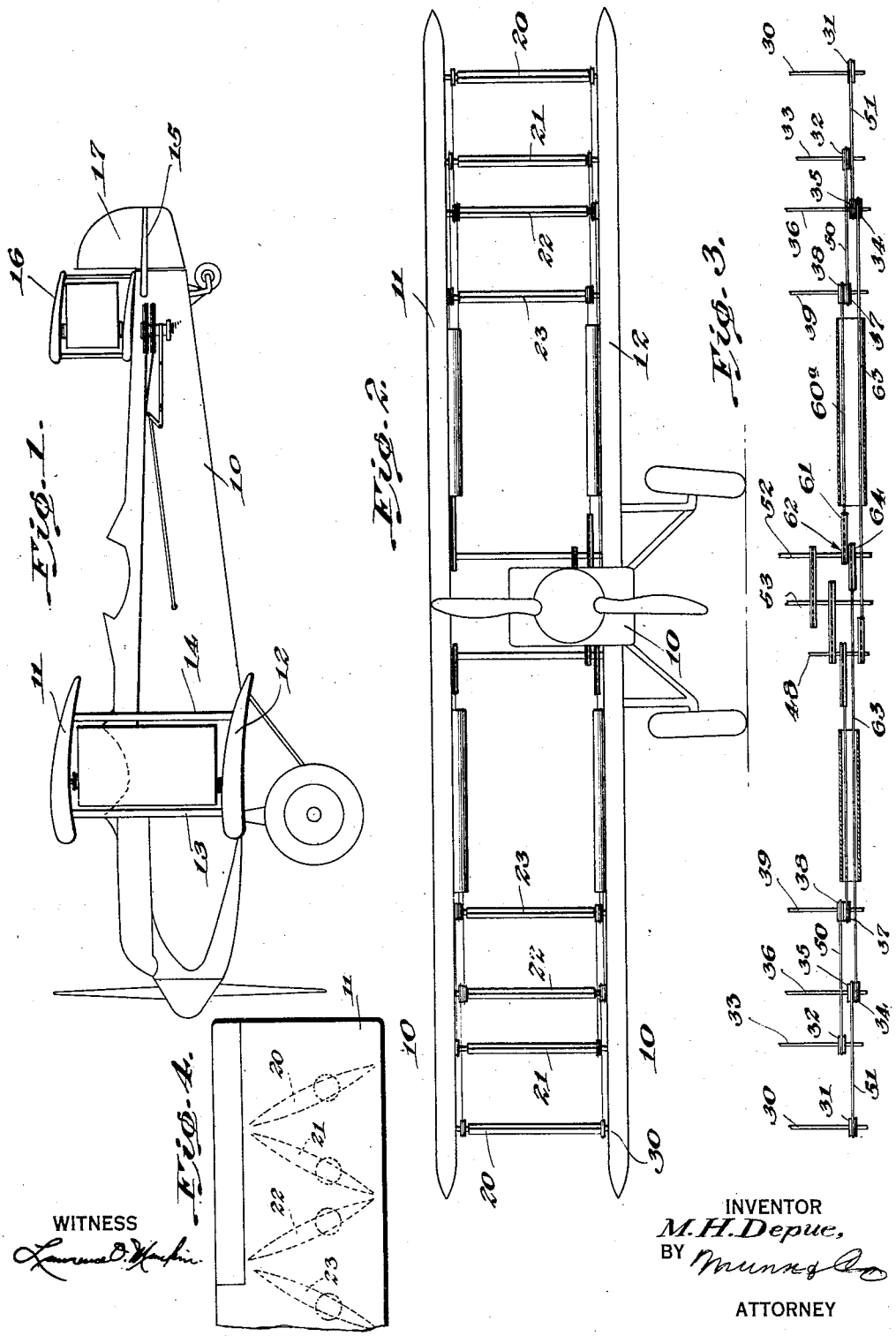
INVENTOR
*M. H. Depue,*
BY
ATTORNEY

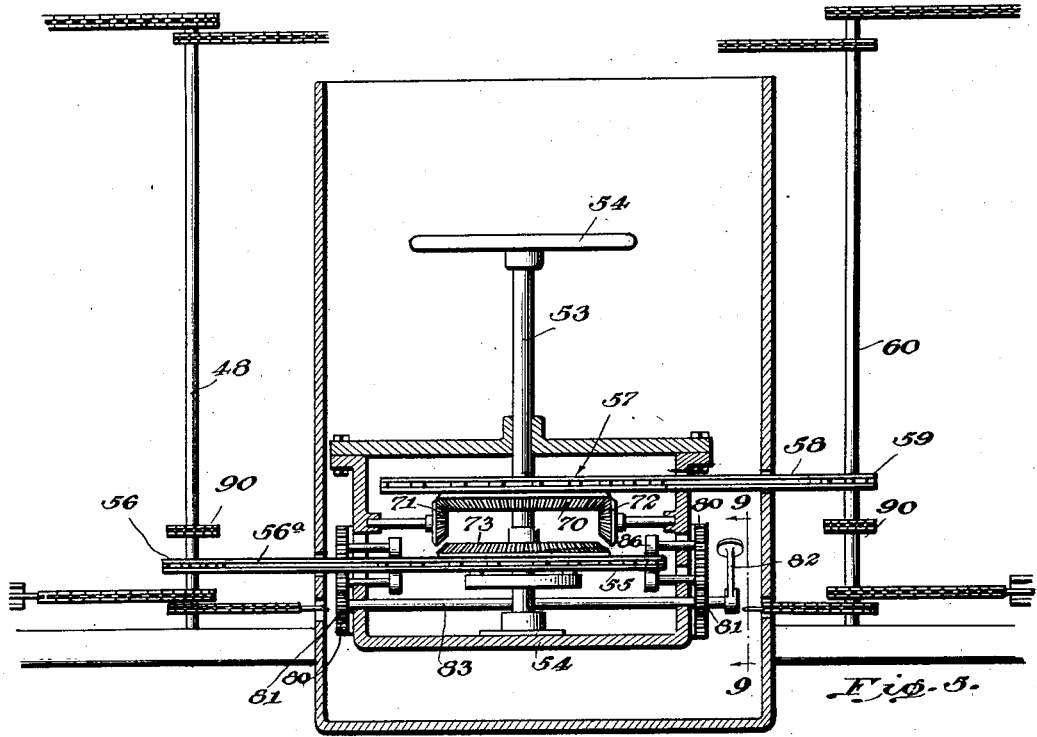
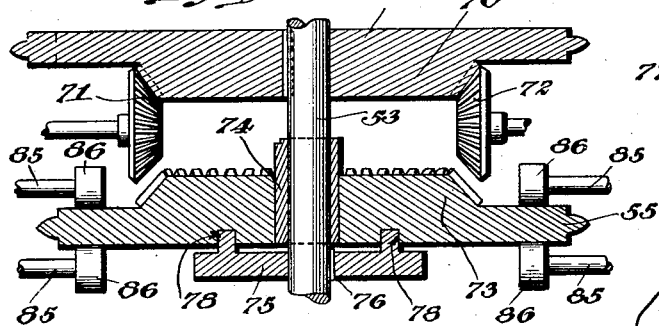
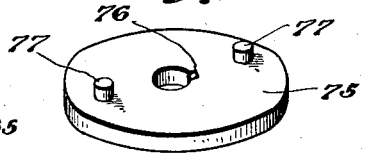
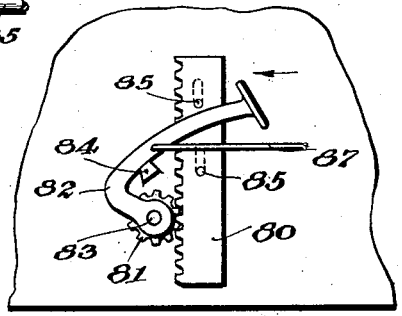
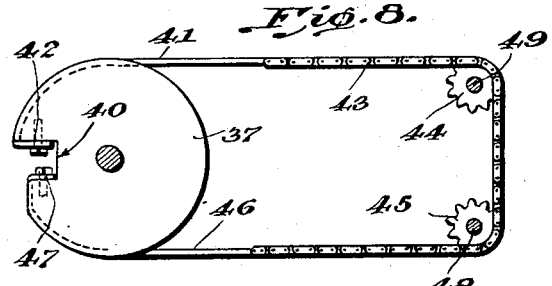
INVENTOR
M. H. Depue

June 2, 1931.        M. H. DEPUE        1,808,344
CONTROL FOR AIRPLANES
Filed Dec. 5, 1929        4 Sheets-Sheet 3
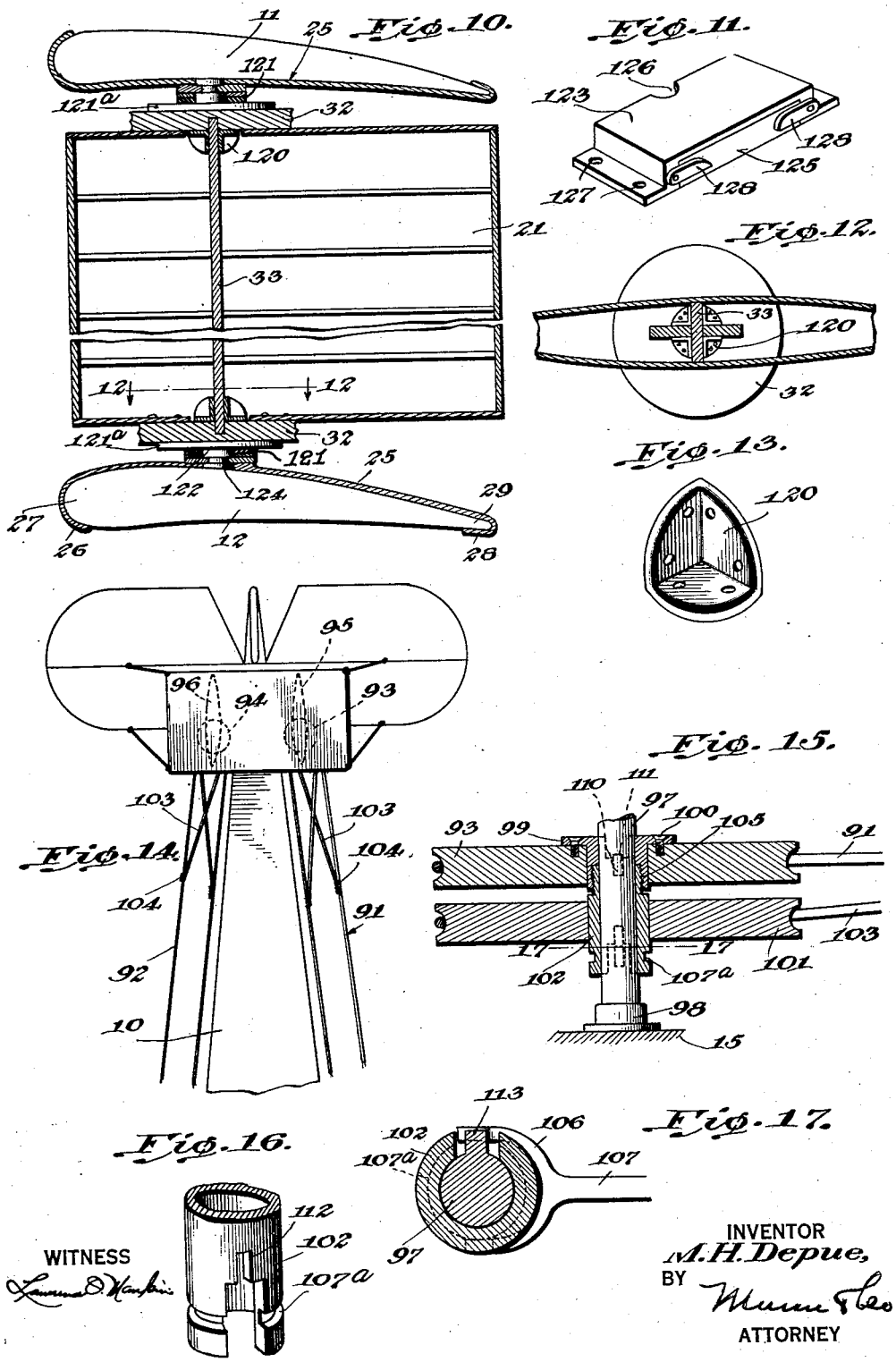

June 2, 1931.                M. H. DEPUE                 1,808,344
                         CONTROL FOR AIRPLANES
                         Filed Dec. 5, 1929         4 Sheets-Sheet 4

WITNESS
Laurence D. Hankin

INVENTOR
M. H. Depue,
BY
ATTORNEY

Patented June 2, 1931

1,808,344

UNITED STATES PATENT OFFICE

MICHAEL HENRY DEPUE, OF HOMER, ILLINOIS

CONTROL FOR AIRPLANES

Application filed December 5, 1929. Serial No. 411,914.

This invention relates to a control for airplanes, and has for its object the provision of a device which may be employed in connection with monoplanes or bi-planes for braking the action of the plane when landing so that the plane may be stopped in a considerably shorter distance, the braking means being capable of conversion for use in providing for a safer and more positive right or left turning.

A further object of the invention is the provision of a plurality of buffers mounted either between a pair of wings of a bi-plane or on the wing of a monoplane, the buffers being operated to move together in pairs to form a resistance to bring the plane to a standstill when landing, means being also employed for causing the bumpers to be moved simultaneously at angles to the line of travel of the plane for aiding in causing a right or left turn.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 19:
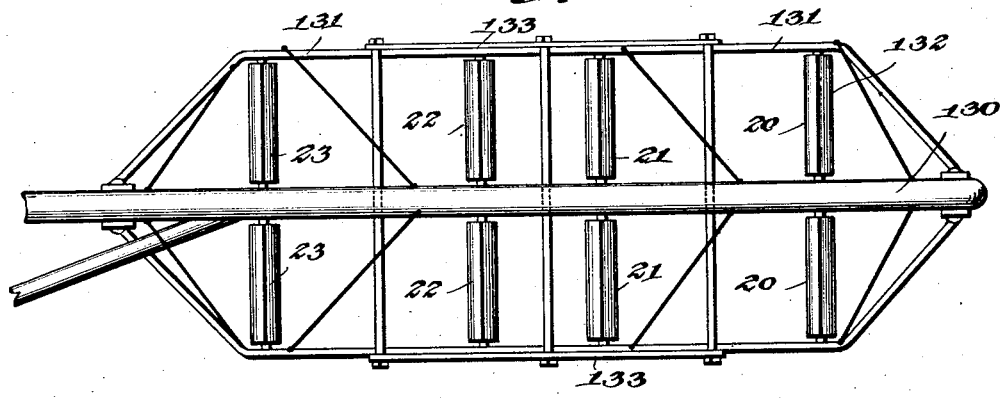
Figure 20:
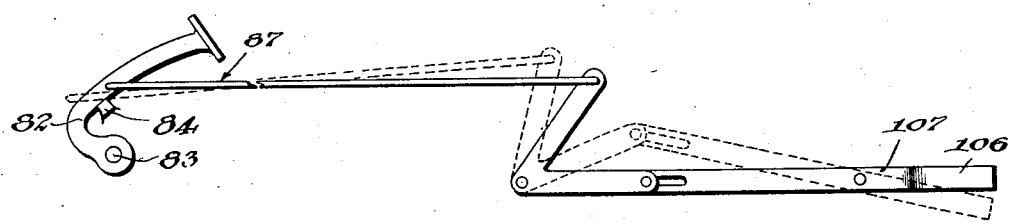

In the drawings:

Figure 1 is a longitudinal side view of an airplane constructed in accordance with the principles of my invention, Figure 2 is a front view of the airplane, Figure 3 is a view in elevation showing more or less diagrammatically the control mechanism for operating the buffers, Figure 4 is a fragmentary plan view of a wing showing the buffers in the formation of resistance pockets, Figure 5 is a vertical section through the control wing of a fuselage disclosing the mechanism for operating the buffers, Figure 6 is an enlarged sectional view showing a detail of a clutch, Figure 7 is a view in perspective of a member of the clutch, Figure 8 is a horizontal section showing the chain and pulley control for a buffer, Figure 9 is a section taken along the line 9—9 of Figure 5, Figure 10 is a vertical section taken along the line 10—10 of Figure 14, Figure 11 is a view in perspective of a casing and key associated with the tail buffers, Figure 12 is a horizontal section taken on the line 12—12 of Figure 10, Figure 13 is a view in perspective of an angle iron for supporting the framework of the tail buffers, Figure 14 is a fragmentary plan view showing the tail construction, Figure 15 is a vertical section of the clutch mechanism for controlling the pulleys which operate the tail buffers, Figure 16 is a view in perspective of a clutch sleeve for controlling the operation of the pulleys shown in Figure 15, Figure 17 is a horizontal section taken along the line 17—17 of Figure 15, Figure 18 is a plan view of a modified form of the invention as applied to a monoplane, Figure 19 is an end view of the form shown in Figure 18, and Figure 20 is a side view showing the operative connections between the front and rear clutches.

Referring more particularly to the drawings, 10 designates a fuselage of a biplane having wings 11 and 12 reinforced by struts 13 and 14. A tailpiece 15 projects laterally from the end of the fuselage and auxiliary planes 16 are mounted on the fuselage and inwardly of the tailpiece. A rudder 17 is operatively disposed adjacent the members 15 and 16.

A plurality of pairs of buffers 20, 21, 22 and 23 are disposed in vertical planes at each end of the wings 11 and 12 and these buffers are normally located in parallel relation and also parallel to the line of travel of the airplane.

As shown more particularly in Figure 10, a metal strap 25 is secured to a wing in any approved manner and has one free end, as shown at 26, bent beneath the leading edge 27 of a wing while the other free end 28 is curved around and bent beneath the trailing edge 29. It may be said that the method of pivotally mounting the buffers whether between the wings 11 and 12 or between the members 15 and 16 of the tailpiece is uniform in the employment of straps 25.

On the shaft 30 and to the buffer 20 are rigidly secured spaced pulleys 31 while spaced pulleys 32 are rigidly connected with the shaft 33 of the buffer 21. A double pulley formed of sections 34 and 35 is rigidly secured to each end of the shaft 36 of the buffer 22 while a double pulley formed of sections 37 and 38 is rigidly secured to each end of the shaft 39 connected to the buffer 23.

Referring more particularly to Figure 8 it will be seen that the section 37 of the double pulley has a cut-out portion 40 to which one end of a strap or cable 41 is attached, as shown at 42. The other end of this cable or strap is connected to one end of a chain 43 which is trained around sprockets 44 and 45. The other end of said chain is connected to one end of a strap 46 while the opposite end of the strap is connected at 47 to the cut-out portion 40 of the section 37 of the double pulley.

The sprocket 45 is rigid with the shaft 48 while a shaft 49 connected with the sprocket 44 is an idler.

A belt 50 is trained around the pulleys 32 and 38 while a wire cable 51 enclosed in a protective tubing is trained around pulleys 31 and 35. These respective belts are secured to one of the pulleys in order to provide for positive rotation of the pulleys as will be presently explained.

A shaft 52 is similar in construction to the shaft 48 and is located upon one side of a centrally disposed operating shaft 53 which is mounted for rotation by a hand wheel 54 which in turn revolves the pulley 55 for revolving a pulley 56 connected with the shaft 48 by means of a belt 56ª. A second pulley 57 is connected with a shaft 53 and drives a wire cable 58 similarly encased in a tubing which in turn revolves a pulley 59 rigid with a shaft 60.

Straps 60ª are connected to the ends of a chain 61 driven by a sprocket 62 rigid with the shaft 52. The shaft 52 drives a belt 63 through a sprocket 64 which in turn drives a pulley 37 and shaft 39.

The operative connections between the buffers 20 to 23, inclusive, at the right hand side of the airplane are similar in construction to the operative connections between the buffers at the left hand side and the same reference numerals are applied to the pulleys and shafts for operating such buffers.

A gear 70 is connected to the shaft 53 and revolves idler gears 71 and 72. A gear 73 is keyed to a sleeve 74 which is loose on the shaft 53. The gear is normally out of mesh with the gears 71 and 72. A disc 75 is keyed to the shaft 53, as shown at 76, and is provided with a pair of pins 77 adapted to be received within a pair of sockets 78 for locking the gear to the disc 75. When the gear 73 is in mesh with the gears 71 and 72 it revolves in a reverse direction from the gear 70. It will also be noted that the sprocket 55 is formed in an integral construction with the gear 73, so that in whatever direction the gear revolves the sprocket will be revolved.

A pair of racks 80 are located upon opposite sides of the housing 54 and are operated by a ratchet wheel 81 secured to or formed integrally with a pedal 82. The pedal and ratchet wheel are secured to a shaft 83. A stop 84 is located adjacent the pedal 82 in order to limit its downward movement.

Each of the racks are provided with axles 85 which carry rollers 86 at the free ends thereof and which are disposed upon opposite faces of the sprockets 55 and in engagement therewith so that when the racks 80 are elevated or lowered by the pedal 82 the sprocket, and likewise the gear, will be elevated or lowered. A link 87 is connected to the pedal 82 for a purpose which will be presently explained. It will be noted that the shaft 83 to which the pedal 82 is rigidly connected extends through the housing 54 and carries the ratchet wheels which operate the racks 80.

Sprockets 90 are secured respectively to the shafts 48 and 60 and chains 91 and 92 are trained respectively on sprockets 93 and 94 and extend rearwardly to the tail-pieces 15 and 16 so that when the buffers carried by the wings 11 and 12 are operated the buffers 95 and 96, respectively, will be operated in a similar manner. Each of the buffers is secured to a shaft 97 mounted in bearings as indicated at 98 to the top and bottom of the members 15 and 16. A sleeve 99 is secured at 100 to the pulley 93 around which a cable 91 is trained. A second pulley 101 is secured to a sleeve 102 on the shaft 97. A cable or belt 103 is trained around the pulley 101 but in the opposite direction to the cable or belt 91 and has its ends, as shown at 104, secured to the portions of the belt or cable 91. A sleeve 102 is threaded, as shown at 105, into the sleeve 99. A yoke 106 is received within an annular groove 107 in the sleeve 102 so that when the arm 107ª is oscillated the sleeve will be moved upwardly or downwardly, as will be presently explained.

The sleeve 99 is provided with a slot 110 which is adapted to receive a key 111 projecting from the shaft 97. The sleeve 102 has a slot 112 to receive a key 113 also projecting from the shaft 37.

The arm 107 is pivoted, at 115, so that it may oscillate in a vertical plane and has one end connected to a bell crank lever 116 pivoted at 117. The other arm or bell crank lever is connected to the link 87.

Referring more particularly to Figure 10 the method of supporting buffers are illustrated. Each buffer has a central shaft, as indicated at 33, and a pulley, as at 32, located at opposite edges of the buffer, brackets 120, shown more particularly in Figure 13, connect the shaft 33 with the top and bottom edges of the buffer. The outer ends of the shaft extend into passages in the pulleys and the pulleys are rigidly connected to the top and bottom portions of the buffers.

A fiber washer 121 is secured to the outer face of each pulley which is reinforced by a metal plate 121$^a$ and a stub shaft 122 is formed integrally with the plate and projects through the washer. A housing 123, formed in two sections, embraces the stub shaft adjacent the annular groove 124 and a key plate 125 has a semi-circular notch 126 received within the annular groove 124 for maintaining the stub shaft in position.

Referring more particularly to Figures 18 and 19 it will be seen that a mono-plane having a single wing 130 is provided with the framework 131 for supporting the buffers 132 upon opposite sides of the wing. A reinforcing frame 133 is located centrally of the wing. The buffers 132 are operated in a manner similar to that shown in the previous figures.

The operation of my device is as follows: The buffers 20 to 23, inclusive, at each end of the wing and the buffers 95 and 96 mounted on the tailpiece are moved in parallel relation to provide for either a right or left hand turn of the airplane and this is normally done by revolving the handwheel 54 which causes the shaft 53 to rotate the gear 70 and the sprocket 57 together with the gear 73 and sprocket 55 in the same direction since the pins 77 of the disc 75 lock the sprocket to the shaft 53.

If it be desired, however, to place the buffers in the angular position shown in Figure 4 in which the buffers form V-shaped pockets as a resistance to the air when landing, it is only necessary to move the pedal 82 in the direction indicated by the arrow in Fig. 9 when the racks 80 will be elevated, thereby causing the gear 73 to be moved into mesh with the gear 71 and 72. At this time the gear 73 and likewise the sprocket 55 are rotated in the opposite direction to the gear 70 so that all of the buffers which are operatively connected with the sprocket 55 will be moved in an opposite direction to the direction of movement of the remaining buffer. The buffers will then assume the position shown in Figure 4.

When the pedal 82 is moved in a direction as indicated at 87, the link will likewise be shifted longitudinally, thereby causing locking of the arm 107 and a downward movement of the sleeve 102. At this time the sleeve will lock the pulley 101 to the shaft 97 and release the pulley 93 from the shaft, since the slot 110 in the sleeve 99 will be moved out of engagement with the key 111. The cables 103 being twisted the pulley 101 will revolve the shaft in the opposite direction and cause the buffers 95 96 to be moved towards each other to form a V-shaped pocket.

While I have shown the cables and pulleys located exteriorly of the wings of the airplane, it will be appreciated that these cables and pulleys may be incorporated within the interior of the wings with the shafts having their opposite ends located within the body of the wings.

I claim:

1. In an airplane, a wing, buffers mounted on the wing and disposed in vertical planes, means for moving the buffers simultaneously at angles to the line of travel of the airplane, said buffers being normally in parallel relation, means for moving one series of buffers at an angle to the other buffers, and a clutch for causing a reversal of movement of one series of buffers.

2. In an airplane, a wing, buffers mounted on the wing and disposed in vertical planes, means for moving the buffers simultaneously at angles to the line of travel of the airplane, a tailpiece, buffers mounted on the tailpiece and having operative connections with the means for actuating the buffers on the wing, and means for causing a reversal of movement of alternate buffers on the wings.

3. In an airplane, a wing, buffers mounted on the wing and disposed in vertical planes, means for moving the buffers simultaneously at angles to the line of travel of the airplane, a tailpiece, buffers mounted on the tailpiece and having operative connections with the means for actuating the buffers on the wing, and means for moving pairs of the buffers on the wing at angles to each other to provide air resistance pockets and for moving the buffers on the tailpiece at an angle to each other.

4. In an airplane, a wing, buffers mounted on the wing and disposed in vertical planes, means for moving the buffers simultaneously at angles to the line of travel of the airplane, alternate buffers forming a series, one series of buffers being operated in an opposite direction to the other series to provide air resistant pockets, and means for causing operation of each series.

MICHAEL HENRY DEPUE.